United States Patent [19]

Tanaka et al.

[11] 4,288,497
[45] Sep. 8, 1981

[54] SILICONE-COATED ARTICLE AND PROCESS FOR PRODUCTION THEREOF

[75] Inventors: Mutsuhiro Tanaka, Ohtake; Masatoshi Kashiwagi, Waki, both of Japan

[73] Assignee: Mitsui Petrochemical Industries Ltd., Tokyo, Japan

[21] Appl. No.: 111,674

[22] Filed: Jan. 14, 1980

[30] Foreign Application Priority Data

Jan. 16, 1979 [JP] Japan .................................. 54/3599

[51] Int. Cl.$^3$ .......................... B05D 3/02; B32B 9/04; B32B 13/12
[52] U.S. Cl. .................................. 428/447; 427/387; 427/391; 427/411; 428/451; 428/514
[58] Field of Search .................... 427/391, 387, 393.5, 427/411; 428/447, 451, 511, 514

[56] References Cited

U.S. PATENT DOCUMENTS

| | | | |
|---|---|---|---|
| 3,463,661 | 8/1969 | Benson | 427/411 X |
| 3,493,419 | 2/1970 | Jones et al. | 427/411 X |
| 3,567,571 | 3/1971 | Martinovich | 428/451 X |
| 3,931,448 | 1/1976 | Parkinson | 428/451 |

FOREIGN PATENT DOCUMENTS

| | | |
|---|---|---|
| 746066 | 11/1966 | Canada . |
| 866250 | 3/1971 | Canada . |
| 37-25820 | 6/1962 | Japan . |
| 48-16251 | 2/1973 | Japan . |
| 49-12414 | 1/1974 | Japan . |
| 51-14544 | 9/1976 | Japan . |

OTHER PUBLICATIONS

*Polymer Processing,* vol. 27, No. 9, pp. 327-333, (1978).

*Primary Examiner*—Michael R. Lusignan
*Attorney, Agent, or Firm*—Sherman & Shalloway

[57] ABSTRACT

A silicone-coated article having releasability imparted thereto by the coating of a silicone, wherein that surface of said article on which to coat the silicone is composed of a resin consisting of a polar group-containing olefinic resin comprising (a) 55 to 99% by weight of a unit derived from an olefin and (b) 1 to 45% by weight of a unit derived from a radical-polymerizable monomer containing a polar group selected from the class consisting of

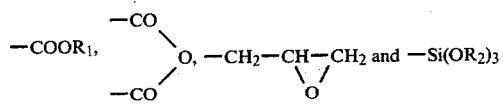

in which $R_1$ represents a hydrogen atom, a metal capable of forming a salt with the carboxyl group, or a monovalent hydrocarbon group, and $R_2$ represents a monovalent hydrocarbon group; and a method for the production thereof.

17 Claims, No Drawings

SILICONE-COATED ARTICLE AND PROCESS FOR PRODUCTION THEREOF

This invention relates to a silicone-coated article, and more specifically to a silicone-coated article having improved adhesion between the substrate and the silicone coating and to a simple method for producing it.

Silicones are used in various applications utilizing their superior surface release and gloss. For example, a releasable paper, a kind of silicone-coated article resulting from the formation of a surface layer of silicone on a paper substrate is generally obtained by coating a release silicone on the surface of a surface-treated paper substrate such as a glassine paper, parchment paper, kraft paper, clay-coated paper, polyvinyl alcohol-undercoat paper and polyethylene laminate paper. If the silicone is directly coated on the surface of an untreated paper substrate, the silicone is absorbed by the texture of the paper, and the pick-up of the silicone naturally increases. Thus, when the paper substrate is treated in advance with a size or a polyolefin such as low-density polyethylene is laminated to it, the amount of the expensive silicone can be reduced, and a silicone-coated paper having better releasability can be obtained.

The starting silicone used in the aforesaid application is generally a composition comprising a silicone compound having dimethylpolysiloxane or a product resulting from the substitution of hydrogen or phenyl for a part of its methyl groups and being blocked at its ends with a functional group such as a hydroxyl group, a vinyl group or hydrogen, and an organosilane compound capable of reacting with the functional group to crosslink the silicone compound, and/or a crosslinking catalyst.

In the case of release papers, etc., the silicone on the polyolefin laminate layer should not migrate to another layer with which it makes contact. In many cases, the release paper or film is used to protect a tacky layer such as an adhesive tape and is removed immediately before the use of such a tacky layer. Migration of the silicone to the adhesive layer would reduce the adhesion strength of the adhesive layer. To prevent it, it is necessary to fully secure adhesion between the silicone and the polyolefin laminated to the paper. Because the adhesion between the silicone and the polyolefin is never good, polyolefins for use in such an application are generally treated in many ways in order to improve their adhesion to silicones.

For example, it is the general practice to subject the surface of a polyolefin layer laminated to paper to a corona discharge treatment so as to improve its adhesion to a silicone (see, for example, Japanese Patent Publication No. 6998/78, and Japanese Laid-Open Patent Publication No. 41336/78).

The corona discharge treatment, however, not only complicates the process, but also gives off offensive odors. Change with time of the adhesion strength of the treated surface is also a problem. Moreover, the corona discharge treatment can be performed on materials of a planar shape such as films or sheets, but cannot be applied to materials of non-planar surfaces such as molded articles of three-dimensional configuration. Accordingly, it is not the general practice to coat a silicone on the surface of a molded article of three-dimensional configuration to form a migration-free silicone coating. Consequently, polyolefin articles which make use of the properties of a silicone coating, such as ice-making trays, molds for ice confections and dishes for sticky foods utilizing the releasability of silicones, have not yet gained commercial acceptance.

Instead of performing such a corona discharge treatment, it was also suggested to form an organosiloxane coating on a hydrocarbon polymer by applying a specified trimethylsiloxy-terminated triorganosiloxane to the surface of a hydrocarbon polymer such as polyolefins and hydrocarbon elastomers, and subjecting the applied organosiloxane to high energy radiation or ultraviolet radiation or heating it to a temperature above 80° C. (Japanese Patent Publication No. 15551/78). This surface-treating method, however, is not commercially feasible because it cannot impart sufficient adhesiveness and requires a special operation.

It is a primary object of this invention therefore to provide an article having a migration-free silicone coated layer and improved adhesion to the surface of the substrate.

Another object of this invention is to provide a method for forming a durable silicone coating on various substrates of planar to three-dimensional configurations with relative simplicity.

Other objects and advantages of this invention will become apparent from the following description.

According to this invention, there is provided a silicone-coated article having releasability imparted thereto by the coating of a silicone, wherein that surface of said article on which to coat the silicone is composed of a resin containing a polar group-containing olefinic resin comprising (a) 55 to 99% by weight of a unit derived from an olefin and (b) 1 to 45% by weight of a unit derived from a radical-polymerizable monomer containing a polar group selected from the class consisting of

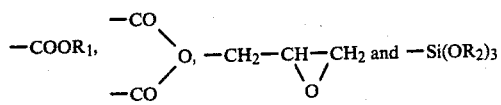

in which $R_1$ represents a hydrogen atom, a metal capable of forming a salt with the carboxyl group or a monovalent hydrocarbon group, and $R_2$ represents a monovalent hydrocarbon group.

It is well known that olefinic copolymers containing a polar group such as a carboxyl or acid anhydride group can be bonded well to various substrates having a polar group, such as metals (e.g., aluminum, iron), glass, and resins such as polyamides and polyesters (see, for example, Japanese Patent Publication No. 23494/63, and Japanese-language publication entitled "Polymer Processing", Vol. 27, No. 9, page 32, 1978). It has now been found in accordance with this invention that certain polyolefinic copolymers containing a polar group also show superior adhesion to silicones which are generally considered to be non-polar and whose surface is non-tacky and has releasability, especially to releasing silicones.

The present invention is based on this discovery, and is characterized by the fact that the surface of a substrate on which to coat a silicone is made of a resin containing an olefinic copolymer having the abovespecified polar groups, thereby to improve the adhesion of the substrate surface to a silicone coating.

Basically, the olefinic copolymer having a polar group used in this invention is a copolymer obtained by the copolymerization of (a) an olefin with (b) a radical-polymerizable monomer having a polar group.

The olefin used in the copolymerization may be linear or branched, and contains 2 to 6 carbon atoms, preferably 2 to 4 carbon atoms. Examples are ethylene, propylene, butene-1, 4-methyl-1-pentene, and hexene-1. Ethylene is preferred. These olefins can be used singly, or as a mixture of two or more.

The radical-polymerizable monomer is a monomer having per molecule 1 to 4, preferably 1 to 2, polar groups selected from the class consisting of

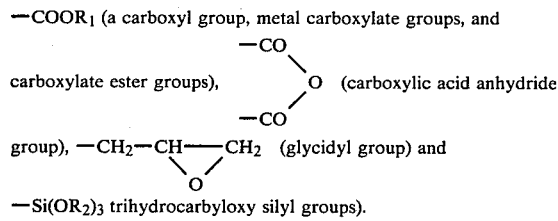

$-Si(OR_2)_3$ trihydrocarbyloxy silyl groups).

In the polar group $-COOR_1$, the "metal capable of forming a salt with the carboxyl group" represented by $R_1$ includes, for example, an alkali metal such as sodium, potassium and lithium, an alkaline earth metal such as magnesium, calcium and barium, zinc, and aluminum. Sodium, potassium, zinc and magnesium are preferred. The "monovalent hydrocarbon group" represented by $R_1$ which will form an ester with the carboxyl group includes, for example, alkyl groups having 1 to 10 carbon atoms, preferably 1 to 8 carbon atoms, such as methyl, ethyl, n-propyl, isopropyl, n-butyl, isobutyl, sec-butyl, tert-butyl, n-pentyl, isoamyl, 2-ethylhexyl and n-octyl; cycloalkyl groups having 5 to 7 carbon atoms such as cyclopentyl, cyclohexyl and cycloheptyl; and aralkyl groups having 7 or 8 carbon atoms such as benzyl or phenethyl. The alkyl groups are especially preferred.

In the polar group $-Si(OR_2)_3$, the "monovalent hydrocarbon group" represented by $R_2$ includes the same species as described above with regard to $R_1$, and alkyl groups containing 1 to 8 carbon atoms are preferred.

Specific examples of the radical polymerizable monomer having such a polar group are as follows:

(i) $C_3-C_{11}$, especially $C_3-C_4$, ethylenically unsaturated aliphatic monocarboxylic acids such as acrylic acid, methacrylic acid, crotonic acid, isocrotonic acid and 1-undecylenic acid.

(ii) Esters, especially $C_1-C_8$ alkyl esters of the aforesaid ethylenically unsaturated aliphatic monocarboxylic acid, such as methyl acrylate, ethyl acrylate, n-propyl acrylate, isopropyl acrylate, n-butyl acrylate, methyl methacrylate, ethyl methacrylate, n-propyl methacrylate, isopropyl methacrylate, tert-butyl methacrylate, cyclohexyl acrylate, cyclohexyl methacrylate, benzyl acrylate, benzyl methacrylate, phenethyl acrylate, methyl crotonate, and 2-ethylhexyl acrylate.

(iii) $C_4-C_6$, especially $C_4-C_5$, ethylenically unsaturated aliphatic or $C_8-C_9$ ethylenically unsaturated alicyclic dicarboxylic acids or the anhydrides thereof, such as maleic acid, fumaric acid, citraconic acid, itaconic acid, 5-norbornene-2,3-dicarboxylic acid, tetrahydrophthalic acid, maleic anhydride, itaconic anhydride, and tetrahydrophthalic anhydride.

(iv) Vinyl ($C_1-C_8$, especially $C_1-C_2$, alkoxy) silanes, such as vinyl(trimethoxy)silane, vinyl(triethoxy)silane, vinyl(tribenzyloxy)silane, and (vinyl(triphenethyloxy) silane.

(v) Glycidyl compounds such as glycidyl acrylate, glycidyl methacrylate and allyl glycidyl ether.

Preferred among these monomers are acrylic acid, methacrylic acid, crotonic acid, isocrotonic acid, 1-undecylenic acid, maleic acid, fumaric acid, citraconic acid, itaconic acid, 5-norbornene-2,3-dicarboxylic acid, tetrahydrophthalic acid, maleic anhydride, itaconic anhydride, ethyl acrylate, butyl acrylate, methyl methacrylate, propyl methacrylate, vinyltrimethoxysilane and glycidyl methacrylate. Acrylic acid, methacrylic acid, maleic acid, maleic anhydride, ethyl acrylate, butyl acrylate, methyl methacrylate, propyl methacrylate and vinyltrimethoxysilane are especially preferred. Above all, methacrylic acid, ethyl acrylate, maleic anhydride and vinyltrimethoxysilane are preferred.

These polar group-containing radical-polymerizable monomers may be used singly or as a mixture of two or more.

The copolymerization of the olefin with the radical polymerizable monomer containing a polar group can be carried out in one or a plurality of steps by random copolymerization, block copolymerization or graft copolymerization in accordance with a known method such as solution polymerization, bulk polymerization, emulsion polymerization or suspension polymerization.

The copolymerization is carried out such that the resulting copolymer generally contains 55 to 99% by weight, preferably 80 to 98% by weight, of a unit derived from the olefin, and 1 to 45% by weight, preferably 2 to 20% by weight, of a unit derived from the radical-polymerizable monomer, based on the weight of the copolymer.

The olefinic copolymer containing a polar group used in this invention may contain as a third component up to 20% by weight, preferably up to 10% by weight, more preferably up to 5% by weight, based on the weight of the copolymer, of a unit derived from another radical-polymerizable monomer.

Examples of the other radical-polymerizable monomer which can be used include vinyl acetate, vinyl chloride and styrene. Vinyl chloride and styrene are preferred.

The molecular weight of the olefinic copolymer containing a polar group prepared as above is not critical, and can be varied according to the purpose of use, etc. Generally, the resulting copolymer has a number average molecular weight of about $1.5 \times 10^4$ to about $8 \times 10^5$, preferably about $2 \times 10^4$ to about $5 \times 10^5$.

An olefinic copolymer containing a metal carboxylate group as the polar group may be easily obtained by at least partially neutralizing the carboxyl-containing olefinic copolymer with an alkali containing the desired metal ion by a method known per se.

Typical examples of the polar group-containing olefinic copolymers used conveniently in this invention are shown below.

(1) Random copolymers

Random copolymers of olefins with the radical polymerizable monomers containing a polar group such as ethylene/acrylic acid copolymer, ethylene/methacrylic acid copolymer, ethylene/maleic anhydride copolymer, ethylene/methyl acrylate copolymer, ethylene/ethyl acrylate copolymer, and ethylene/methyl methacrylate copolymer.

(2) Graft copolymers

Copolymers obtained by grafting the radical polymerizable monomer having a polar group to olefinic (co) polymers, such as acrylic acid-grafted polyethylene, maleic anhydride-grafted polyethylene, maleic anhydride-grafted polypropylene, maleic anhydride-grafted ethylene/vinylacetate copolymer, vinyltrimethoxysilane-grafted polyethylene, vinyltrimethoxysilane-grafted ethylene/vinylacetate copolymer, and glycidyl methacrylate-grafted polyethylene.

(3) Ionomer copolymers

Copolymers of the type exemplified in (1) and (2) above in which at least a part of the carboxyl group forms a salt with a metal ion (e.g., sodium, potassium, magnesium, zinc, etc.), such as partially or wholly neutralized products by sodium, zinc, magnesium, etc. of ethylene/methacrylic acid copolymer or ethylene/methacrylic acid/isobutyl acrylate terpolymer. The degree of neutralization is desirably at least 10%, preferably at least 20%.

Especially preferred groups of the copolymers for use in this invention are as follows:

(A) Ethylene/methacrylic acid copolymer, ethylene/methacrylic acid/isobutyl acrylate terpolymer, and metal salts of these.

(B) Copolymers obtained by graft-copolymerizing maleic anhydride or vinyltrimethoxysilane onto polyethylene or ethylene/vinyl acetate copolymer.

(C) Ethylene/ethyl acrylate copolymer.

The olefinic copolymer containing a polar group described hereinabove may be used singly. If desired, it may be used as a blend with another olefinic resin having compatibility with the copolymer. Examples of the other olefinic resin which can be blended include polyethylene, polypropylene, polybutene, poly(4-methyl-1-pentene), ethylene/vinyl acetate copolymer, ethylene/propylene/diene copolymers, propylene/butene copolymer, polybutadiene, and polyisobutylene. One or more of these blending resins may be used.

Whether the polar group-containing olefinic copolymer is used singly or as a blend, it is important that the amount of the polar group should be present therein in a concentration above a certain limit. Specifically, when the olefinic copolymer containing a polar group is a random copolymer (including the aforesaid ionomer copolymer), the amount of the monomeric unit containing the polar group may be at least 0.1% by weight, preferably 1 to 45% by weight, more preferably 10 to 20% by weight, based on the weight of the copolymer or blend. When the olefinic copolymer containing a polar group is a graft copolymer, it is desirable that the amount of the polar group should be at least 0.001% by weight, preferably 0.01 to 10% by weight, more preferably 0.05 to 8% by weight, based on the weight of the copolymer or blend.

The copolymer or blend, after, if desired, additives such as coloring agents, fillers, antioxidants antistatic agents, antiblocking agents, and slipping agents are incorporated, is molded into a shaped article of any desired shape such as a film, sheet, plate, foam, tray, box or cylinder, and can be used as a substrate for release coating of a silicone.

Alternatively, the copolymer or blend may be laminated to, or coated on, the surface of substrates of various forms (films, sheets, and three-dimensional configurations) made from paper, woven fabrics, plastics, metals, etc. The lamination or coating may be performed by known methods, for example, a method comprising melting the copolymer or blend or dissolving it in a solvent, and laminating the melt or solution to or on a substrate, a method comprising applying a dispersion or emulsion of the copolymer or blend to a substrate, a method involving molding the copolymer or blend into a film or sheet, and bonding the film or sheet to a substrate, or a method involving injection-molding or blow-molding the copolymer or blend onto a substrate.

The thickness of the laminate or coating may be varied depending upon the use, etc. Generally, it is suitably about 1 to about 500 $\mu$m, preferably about 5 to about 100 $\mu$m.

According to this invention, a silicone is coated on that surface of the above-prepared article which is made of a resin containing the olefinic copolymer containing a polar group.

It should be understood that in the present specification and the appended claims, the article on which to coat a silicone denotes not only a molded article which is entirely made of the aforesaid copolymer or blend but also a molded article on the surface of which the aforesaid copolymer or blend is laminated or coated. The invention, however, is particularly useful when applied to various shaped substrates on which the aforesaid resin containing the olefinic copolymer with a polar group is laminated or coated, above all resin-coated papers.

Thus, according to a preferred aspect of this invention, there is provided a method for producing a silicone-coated article, which comprises forming a resin layer containing the aforesaid olefinic copolymer containing a polar group on the surface of a substrate to which releasability is to be imparted, particularly the surface of paper, and then coating a silicone on the resin layer.

Advantageously, the above method is applicable to adhesive tapes or release papers. It is desirable to impart sufficient strength to the tapes or paper as a substrate, and minimize the thickness of the resin layer containing the olefinic copolymer with a polar group, and/or the silicone coated layer. To form coated films of reduced thickness, it is suitable to use a method involving forming a coated film from an emulsion or dispersion.

Since according to this invention, a water-soluble ionomer copolymer which can be dispersed in water can be used to form the resin layer, the invention offers the great commercial advantage that the resin layer can be formed by coating an aqueous dispersion of the olefinic copolymer with a polar group.

An aqueous dispersion of a metal salt (e.g., Na, Mg, or Zn salt) of an ethylene/methacrylic acid copolymer or an ethylene/methacrylic acid/isobutyl acrylate terpolymer is especially preferred as the aqueous dispersion.

Application of the aqueous dispersion to the substrate can be effected by a known method, for example the methods disclosed in Canadian Pat. Nos. 866,250 and 746,066. The aqueous dispersion applied is then dried. Drying can be performed at room temperature. But generally, it is preferred to perform it at an elevated temperature of about 70° to 150° C.

The amount of the aqueous dispersion coated is not critical, and can be varied according to the purpose of using the coated article, etc. Generally, the suitable thickness after drying of the resin layer is 1 to 100 $\mu$m, preferably 5 to 50 $\mu$m.

Then, a silicone is coated on the surface of the resin layer formed on the substrate.

The silicone may be any of those used heretofore in release coating which can be used to coat the surface of the resin layer containing the olefinic copolymer having a polar group. Generally, these silicones are polymeric organosilicon compounds having an organopolysiloxane structure, which can be classified into the condensation curable type and the addition-reaction curable type. Both types can be used in this invention. An example of the condensation curable type is a composition comprising a hydroxyl-terminated organopolysiloxane, a silane compound as a curing agent and optionally an organic acid metal salt as a catalyst. An example of the addition-reaction curable type is a composition comprising a siloxane having a vinyl group, a silane compound having a hydroxyl group as a curing agent, and optionally a platinum compound as a catalyst. Which of these types should be chosen depends upon the properties, curability and film-formability of the silicone compound.

These silicone compounds are available both as a one-package and a two-package. Both types can be used in this invention. These compositions are curable at room temperature or at elevated temperatures. If the curing should be performed by heating the composition for a long period of time at a temperature above the melting point of the olefinic copolymer having a polar group, the resin of the primer layer will be deformed. Accordingly, it is generally preferred to use silicone compositions which can be cured at low temperatures.

Specific examples of the release silicones useful in the present invention include the following organosilicone compounds. It should be understood however that these are merely illustrative, and do not restrict the scope of the present invention.

(1) Dimethyl polysiloxanes represented by the following general formula

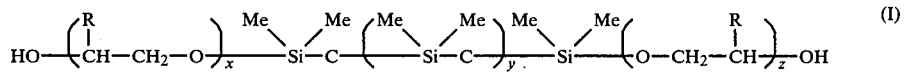

wherein R may be hydrogen or an aryl group or a higher alkyl group having from 1 to 20 carbon atoms or an alkyl substituted aryl group; and x, y, and z are integers ranging from 1 to 4. Such compounds are often made commercially available as easily emulsified fluids which have viscosities ranging from about 7.0 to about 60,000 cps at 25° C.

(2) Organofunctional silicones such as silicone polycarbinol, mercapto silicone, carboxyl silicone, chloroalkyl silicone, vinyl silicone, and such other compounds are also useful. The structures of such compounds are represented by either of the following two basic formulas:

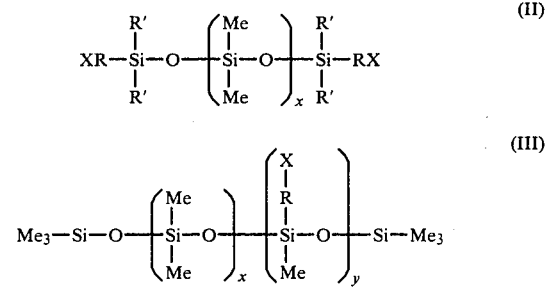

wherein R is an organic spacer, R' is an alkyl or an alkoxy group, and X is an organic reactive group including: alcohol, mercaptan, amine, carboxylic acid chloroalkyl and vinyl.

Since these silicone compositions are generally prepared as solutions in organic solvents such as toluene or xylene or as emulsions or dispersions in organic solvents or water, these solutions, emulsions or dispersions are applied either directly or after dilution with suitable solvents to the surface of the resin containing the olefinic copolymer containing a polar group.

When the surface to be coated is planar, the coating may be performed by roll coating, bar coating, cast coating, gravure coating, screen coating, knife coating, dip coating, spray coating, brush coating, etc. If the surface to be coated is of three-dimensional configuration, dip coating, spray coating, brush coating, etc. may be used.

The silicone compositions may also be used in the form of resin, rubber, varnish or oil. In this case, the coating may be carried out by an extrusion laminating method, and other hot-melt coating methods.

The thickness of the silicone coating differs depending upon the purpose of forming the silicone coating, and can be adjusted by the amount of the silicone coated, the silicone concentration in the coating composition. Generally, the suitable thickness on drying is about 0.1 to 100 μm, preferably 1 to 50 μm.

After coating, the solvent, dispersion medium etc. are removed by drying. Since, however, the curing reaction of the silicone compound proceeds at a higher rate if carried out at an elevated temperature, if it is desired to expedite the curing, the drying is desirably performed by heating to such an extent that the layer of the resin containing the olefinic copolymer with a polar group is not deformed. The curing reaction is terminated in about 1 minute to several hours depending upon the heating temperature to form a silicone coating having good adhesion to the surface of the resin layer containing the olefinic copolymer having a polar group. It is not entirely clear why such a good adhesion can be obtained. It is theorized however that (a) the hydroxyl group or the $-Si-O-_n$ bond moiety of the silicone has affinity with the polar group in the olefinic copolymer, and (b) the hydroxyl group of the silicone or the functional group in the silane compound as a curing agent reacts with the polar group of the olefinic copolymer to form a chemical bond.

The article coated with the silicone may, if required, be further processed. However, since the cured coating of silicone is generally not thermoplastic despite its stretchability, any processing operation which will result in extreme stretching of the silicone coating is undesirable because it will damage the silicone coating.

The article having the release silicone coated on its surface can be used widely in various applications such as release paper, release films, molds, release molded articles (e.g., ice-making trays, molds for ice confections). It can be used especially advantageously as a release paper.

In the silicone-coated article in accordance with this invention, the silicone layer shows good adhesion to the surface of the resin layer containing the olefinic copolymer with a polar group without performing corona discharge, etc. as in the prior art, it can be applied also to molded articles having a surface of three-dimensional configuration on which a silicone cannot be coated by the prior techniques because of the in effectiveness of corona discharge treatment on such a surface. Accordingly, this makes it possible to utilize a silicone coated laminate in a much wider range of applications than in the past. In addition, the adhesion of the silicone layer to the surface of the olefinic copolymer having a polar group is much better than that to a surface subjected to corona discharge. Accordingly, a polymer having a poor adhesion to silicones because of the absence of a polar group can be improved to have feasible adhesion to silicones by blending it with a small amount of the olefinic copolymer having a polar group in accordance with this invention. The range of polymers to which the silicone coating can be applied can be broadened. Phenolic resins and polycarbonate resins which have been known to have good adhesion to silicones have high rigidity and cannot be used in applications which simultaneously require flexibility and releasability, for example as ice-making trays. According to this invention, the resulting silicone-coated article can be effectively used in such an application, too. Moreover, the silicone-coated articles of this invention are economically advantageous even when they are used in the same applications as in the prior art.

The following examples specifically illustrate the present invention.

EXAMPLE 1 AND COMPARATIVE EXAMPLE 1

A condensation curable-type silicone (Toray Silicone SR-2411; one-package; room temperature curable) was diluted with 6 times its volume of n-hexane, and spray-coated onto the surface of a press-formed sheet, 1 mm thick, of each of the olefinic copolymers having polar groups indicated in Table 1. The coated sheet was allowed to stand at room temperature for 24 hours to cure the coated film. After the curing, the coated film had a thickness of about 20 $\mu$m.

The examine the adhesion between the silicone coating and the surface of the resin sheet, the sheet was subjected to a repeated bending test. Specifically, a test specimen, 1 cm wide and 5 cm long, was prepared from the resin sheet. A bending portion having a radius of about 3 mm was formed therein, and the specimen was bent ten times at an angle of about 300°. Then, the rising of the silicone coating was examined visually. Also the surface of the silicone coating was rubbed with a finger, and the peeling of the coating was examined. The coated article was also subjected to an adhesive tape peel test using a "Cellotape®" (a product of Sekisui Kagaku Kogyo Kabushiki Kaisha).

The results are shown in Table 1.

The results demonstrate that the silicone coating showed good adhesion to the surfaces of the sheets made from olefinic copolymers having a carboxyl group, a metal carboxylate group, a carboxylic anhydride group, a carboxylate ester group, and a trialkoxysilyl group, but its adhesion was poor to a polyolefin having no polar group and to polyolefins having a hydroxyl group or acetoxy group as the polar group.

TABLE 1

| | No. | Olefinic polymer | Polar groups | Rising of the coating upon bending (*1) | Peel test by finger rubbing (*2) | Adhesive tape peel test (*3) |
|---|---|---|---|---|---|---|
| Example 1 | 1 | Partial zinc salt (neutralization degree 60%) of ethylene/methacrylic acid (15% by weight) copolymer | —COOH, —COO$^-$/½ Zn$^+$ | 0 | 0 | 0 |
| | 2 | Partial sodium salt (neutralization degree 50%) of ethylene/methacrylic acid (10% by weight) copolymer | —COOH, —COO$^-$ Na$^+$ | 0 | 0 | 0 |
| | 3 | Partial sodium salt (neutralization degree 30%) of ethylene/methacrylic acid (15% by weight) copolymer | —COOH, —COO$^-$ Na$^+$ | 0 | 0 | 0 |
| | 4 | Ethylene methacrylic acid (9% by weight) copolymer | —COOH | 0 | 0 | 0 |
| | 5 | Maleic anhydride (1.4% by weight)-grafted ethylene/vinyl acetate (14% by weight) copolymer | (—CO)$_2$O, —COCCH$_3$ | 0 | 0 | 0 |
| | 6 | Maleic anhydride (2.3% by weight)- | (—CO)$_2$O | 0 | 0 | 0 |
| | 7 | Vinyltrimethoxysilane (1.3% by weight)-grafted ethylene/vinyl acetate (28% by weight)copolymer | —Si(OCH$_3$)$_3$, —OOCCH$_3$ | 0 | 0 | 0 |
| | 8 | Ethylene/ethylene acrylate (19% by weight) copolymer | —COOC$_2$H$_5$ | 0 | 0 | 0 |
| Comparative Example 1 | 1 | Low-density polyethylene | None | X | X | X |
| | 2 | Ethylene/vinyl acetate (14% by weight) copolymer | —OOCCH$_3$ | X | X | X |
| | 3 | Partially saponified (saponification degree 90%) product of ethylene/vinyl acetate (33% by | —OH, —OOCCH$_3$ | 0 | Δ | Δ |

TABLE 1-continued

| No. | Olefinic polymer | Polar groups | Rising of the coating upon bending (*1) | Peel test by finger rubbing (*2) | Adhesive tape peel test (*3) |
|---|---|---|---|---|---|
| | weight) copolymer | | | | |

(*1): Evaluation of the rig rising of the coating by bending:
0 : No rising
Δ : Slight rising
X : The coating peeled and rose.
(*2): Evaluation of the peel test by finger rubbing:
0 : No peeling
Δ : Partly peeled
X : Easily peeled
(*3): Evaluation of the adhesive tape peel test:
0 : No peeling
0-Δ : Slightly peeled
Δ : Partly stuck to the adhesive tape and thus peeled.
X : Wholly stuck to the adhesive tape and thus peeled.

EXAMPLE 2 AND COMPARATIVE EXAMPLE 2

The following condensation curable silicones (two-package) were mixed with the other ingredients shown below.

| | |
|---|---|
| Toray Silicone SD-7202 (condensation type) | 100 parts by weight |
| Toray Silicone SRX-244 (condensation type) | 10 parts by weight |
| Toray Silicone SRX-242AC (catalyst) | 4 parts by weight |
| Toluene | 700 parts by weight |

The mixture was spray coated on a 1 mm-thick sheet prepared from each of the same olefinic polymers as used in Example 1 and Comparative Example 1. After coating, the coated sheet was allowed to stand at room temperature for 24 hours to cure the coating. After the curing, the coating had a thickness of about 20 μm. The adhesion between the silicone coating and the surface of the resin sheet was examined in the same way as in Example 1, and the results are shown in Table 2. It is seen from Table 2 that a two-package silicone composition shows quite the same tendency as a one-package silicone composition.

TABLE 2

| No. | Olefinic polymer | Rising of the coating upon bending | Peel test by finger rubbing | Adhesive tape peel test |
|---|---|---|---|---|
| Example 2 | | | | |
| 1 | Same as No. 1 of Example 1 | 0 | 0 | 0 |
| 2 | Ethylene/methacrylic acid (15% by weight) copolymer | 0 | 0 | 0 |
| 3 | Same as No. 4 of Example 4 | 0 | 0 | 0 |
| 4 | Same as No. 5 of Example 1 | 0 | 0 | 0 |
| 5 | Same as No. 6 of Example 1 | 0 | 0 | 0 |
| 6 | Same as No. 7 of Example 1 | 0 | 0 | 0 |
| 7 | Same as No. 8 of Example 1 | 0 | 0 | 0 |
| Comparative Example 2 | | | | |
| 1 | Same as No. 1 of Comparative Example 1 | X | X | X |
| 2 | Same as No. 2 of Comparative Example 1 | X | X | X |
| 3 | Same as No. 3 of Comparative Example 1 | Δ | 0 | Δ |

EXAMPLE 3

An ethylene/vinyl acetate (15% by weight) copolymer (EVA), which was the same as that used in No. 2 of Comparative Example 1 and which showed peeling of the entire silicone coating in the adhesive tape test, was blended with each of the olefinic copolymers having a polar group used in Examples 1 and 2 as shown in Table 3 below in the amounts indicated. A 1 mm-thick press-formed sheet was prepared from each of the blends. The same n-hexane solution of silicone as used in Example 1 was brush-coated on the surface of the press-formed sheet, and dried at room temperature for 3 hours to cure it. The adhesion between the silicone coating and the surface of the resin sheet was examined by the adhesive tape test in the same way as in Example 1. In all runs, a marked improvement in adhesion to the silicone coating was noted. The results are shown in Table 3.

TABLE 3

| No. | Olefinic copolymer containing polar groups | Amount in parts by weight per part by weight of EVA | Adhesive tape peel test |
|---|---|---|---|
| 1 | Same as No. 2 of Example 2 | 1 | 0 |
| 2 | " | 2 | 0 |
| 3 | " | 4 | 0-Δ |
| 4 | Same as No. 7 of Example 1 | 1 | 0 |
| 5 | " | 4 | 0 |
| 6 | " | 10 | 0 |
| 7 | Same as No. 5 of Example 1 | 5 | 0 |
| 8 | " | 10 | 0 |
| 9 | " | 20 | 0 |

EXAMPLE 4 AND COMPARATIVE EXAMPLE 3

The following addition-reaction curable silicone was mixed with the other components shown below.

| | |
|---|---|
| Toray Silicone SRX-211 (addition-reaction type) | 100 parts by weight |
| Toray Silicone SRX-212 (catalyst) | 0.6 parts by weight |
| n-Hexane | 500 parts by weight |

The resulting mixture was spray-coated on the surface of a 1 mm-thick press-formed sheet of each of the polar group-containing olefinic copolymers shown in Table 4. The coated surface was heated with hot air at 110° C. for 2 minutes to cure it, and then cooled to room temperature. A silicone coating having a thickness of about 5 μm was formed on the sheet. The adhesion between the silicone coating and the surface of the resin sheet was examined in the same way as in Example 1, and the results are shown in Table 4. It is seen from Table 4 that an addition-reaction curable silicone shows quite the same tendency in adhesion as the condensation curable type.

TABLE 4

| No. | Olefinic copolymer | Peel test by finger rubbing | Adhesive tape peel test |
|---|---|---|---|
| Example 4 | | | |
| 1 | Same as No. 1 of Example 1 (degree of neutralization 20%) | 0 | 0 |
| 2 | Same as No. 3 of Example 1 (degree of neutralization 60%) | 0 | 0 |
| 3 | Partial zinc salt of No. 4 of Example 1 (degree of neutralization 20%) | 0 | 0 |
| 4 | Same as No. 5 of Example 1 | 0 | 0 |
| 5 | Same as No. 7 of Example 1 | 0 | 0 |
| 6 | Same as No. 8 of Example 1 | 0 | 0 |
| 7 | Same as No. 2 of Example 2 | 0 | 0 |
| 8 | Same as No. 8 of Example 3 | 0 | 0 |
| 9 | Same as No. 9 of Example 3 | 0 | 0 |
| 10 | Partial sodium salt of ethylene/methacrylic acid (10% by weight)/isobutyl acrylate (10% by weight) terpolymer (degree of neutralization 30% | 0 | 0 |
| 11 | A 1:2 blend of ethylene/vinyl acetate (28% by weight) copolymer and No. 3 above | 0 | 0 |
| Comparative Example 3 | | | |
| 1 | Same as No. 1 of Comparative Example 1 | X | 0-Δ |
| 2 | Same as No. 2 of Comparative Example 1 | X | 0-Δ |
| 3 | Ethylene/vinyl acetate (19% by weight) copolymer | X | 0-Δ |

EXAMPLE 5

An aqueous dispersion (solids concentration 30% by weight) of a partial sodium salt (the degree of neutralization 33% of an ethylene/methacrylic acid (10% by weight) copolymer was brush-coated on kraft paper, air dried, and then heated with hot air at 100° C. for 1 minute to form a resin coating having a thickness of about 10 μm on the kraft paper. An aqueous dispersion of a condensation curable silicone having the following formulation was brush-coated on the surface of the resin coated layer.

| | |
|---|---|
| Toray Silicone SM-7270 (condensation type) | 50 parts by weight |
| Toray Silicone SM-7271 (catalyst) | 4 parts by weight |
| Toray Silicone SM-7272 (wettability improving agent) | 3 parts by weight |
| Water | 43 parts by weight |

After the coating, the coated article was heated with hot water at 150° C. for 1 minute to form a silicone coating having a thickness of about 1 μm on the resin coated layer. The adhesion between the silicone coating and the resin coating on the kraft paper was examined in the same way as in Example 1 with regard to all of the three items. The rating was 0 in all of these items tested.

A rosin-type tackifier for adhesive tapes was coated on that surface of the coated kraft paper which was opposite to the coated surface. It was slit to a width of 20 mm, and wound up. When the tape was unwound, the tackifier layer and the silicone coating layer could be separated from each other without adhesion.

EXAMPLE 6 AND COMPARATIVE EXAMPLE 4

Each of the polyolefin resins indicated in Table 5 was molded into a tray having a bottom area of 55×195 cm, a top area of 88×200 mm, a height a each corner of 25 mm, and a thickness of about 1 mm.

Each of Toray Silicone SR-2411 (condensation type), Release Coat 996-60 (condensation type, a product of Contour Chemical Co., U.S.A.) and Toray Silicone SRX-211/SRX-212 (100:0.6 parts by weight) blend (addition-reaction type) was diluted with 6 times its volume of n-hexane. The resulting dilution was spray-coated on the inside surface of the tray obtained as above, and dried at room temperature for one day to form a silicone coating having a thickness of about 20 μm on the inside surface of the tray.

Water was poured to each of the silicone-coated tray and a non-coated tray to a volume of about 80%, and the trays were put into a freezer box of a home refrigerator to freeze water in about 8 hours. After the freezing, the trays were taken out from the freezer box. Ice was taken out by pushing the bottom of the tray with fingers from the outside and somewhat bending the tray. This ice-making and ice taking operation was performed once or several times. The adhesion between the tray and ice, the ease of taking of the ice, and the state of peeling of the silicone coating were examined.

It was found that in the silicone-coated ice-making tray, the adhesive strength between the ice and the tray was weak, and the ice could be taken out in a configuration substantially conforming to the configuration of the tray. In contrast, in the tray not coated with the silicone, the ice broke during the ice taking operation, and some of the broken fragments remained adhered to the tray.

On the other hand, when an ice-making tray molded from a polyolefinic resin not containing polar groups was used, removing of ice was easy when the ice was taken out for the first time. But as the ice-making and withdrawing were repeated using the same tray, the silicone coating peeled off gradually from the surface of the tray and adhered to ice. Thus, when the ice was removed from the tray, the ice was partly broken and frequently remained on the tray. Thus, it became gradually difficult to take out the ice from the tray.

Consequently, only those ice-making trays which were molded from the specified polar group-containing olefinic copolymers and coated with a silicone permitted easy removal of ice, and the silicone coating applied did not adhere to ice and was thus not peeled off from the surface of the tray. The effect of the silicone coating was not reduced.

The results are shown in Table 5.

TABLE 5

|  | No. | Polyolefin resin | Silicone coating | Taking out of ice from the tray for the first time | | Taking out of ice from the tray for the fifth time | |
|---|---|---|---|---|---|---|---|
|  |  |  |  | State of taking out ice | Silicone coating | State of taking out ice | Silicone coating |
| Example 6 | 1 | Ionomer resin A (*4) | Toray Silicone SR-2411 | Ice retained the original shape and was easily removed, and did not break. | No peeling of the coating. | Ice retained the original shape and was easily removed and did not break. | No peeling of the coating. |
|  | 2 | Ionomer resin A (*4) | Release Coat 996-60 | Ice retained the original shape and was easily removed, and did not break. | No peeling of the coating. | Ice retained the original shape and was easily removed and did not break. | No peeling of the coating. |
|  | 3 | Ionomer resin A (*4) | Toray Silicone blend | Ice retained the original shape and was easily removed, and did not break. | No peeling of the coating. | Ice retained the original shape and was easily removed and did not break. | No peeling of the coating. |
|  | 4 | Ionomer resin B (*5) | Release Coat 996-60 | Ice retained the original shape and was easily removed, and did not break. | No peeling of the coating. | Ice retained the original shape and was easily removed and did not break. | No peeling of the coating. |
|  | 5 | Ionomer resin C (*6) | Toray Silicone SR-2411 | Ice retained the original shape and was easily removed, and did not break. | No peeling of the coating. | Ice retained the original shape and was easily removed and did not break. | No peeling of the coating. |
|  | 6 | Ionomer resin C (*6) | Release Coat 996-60 | Ice retained the original shape and was easily removed, and did not break. | No peeling of the coating. | Ice retained the original shape and was easily removed and did not break. | No peeling of the coating. |
| Comparative Example 4 | 1 | Low-density polyethylene | None | Difficult to remove ice, and the ice broke and partly remained in the tray. | — | Difficult to remove ice, and the ice broke and partly remained in the tray. | — |
|  | 2 | Low-density polyethylene | Toray Silicone SR-2411 | Ice retained the original shape and was easily removed, and did not break | The coating was slightly peeled. | Difficult to remove ice, and the ice broke and partly remained in the tray. | The coating was considerably peeled. |
|  | 3 | Ionomer resin A | None | Difficult to remove ice, and the ice broke and partly remained in the tray. | — | Difficult to remove ice, and the ice broke and partly remained in the tray. | — |

(*4) Ionomer resin A: Partial sodium salt (degree of neutralization 35%) of an ethylene/methacrylic acid (11% by weight) copolymer.
(*5) Ionomer resin B: Partial zinc salt (degree of neutralization 60%) of ethylene/methacrylic acid (11% by weight) copolymer.
(*6) Ionomer resin C: Partial sodium salt (degree of neutralization 30%) of ethylene/methacrylic acid (15% by weight) copolymer [same as in No. 3 of Example 1]

EXAMPLE 7 AND COMPARATIVE EXAMPLE 5

The following four substrates A to D were provided.

Substrate A

Obtained by coating a partial zinc salt (the degree of neutralization 15%, melt index 5.0 g/10 minutes, density 0.94 g/cm$^3$, melting point 99° C.) of an ethylene/methacrylic acid (15% by weight) copolymer on fine-textured paper (basis weight 81.4 g/m$^2$) to a thickness of 30 microns.

Substrate B

Obtained by coating maleic anhydride (0.2% by weight)-grafted polyethylene (melt index 1.5 g/10 minutes, density 0.94 g/cm$^3$, melting point 100° C.) on the same fine paper as used in substrate A to a thickness of 30 microns.

Substrate C

Obtained by coating low-density polyethylene (melt index 12 g/10 minutes, density 0.915 g/cm$^3$, Vicat Softening point 82° C.) on the same fine paper as in substrate A to a thickness of 30 microns.

Substrate D

Obtained by subjecting the polyethylene surface of substrate C to corona discharge treatment to adjust its surface tension to 42 dynes/cm.

Toray Silicone SRX-211/SRX-212 (100:0.9 parts by weight) blend, which was an addition reaction curable silicone liquid, was diluted with toluene, and coated on the resin coated layer of each of the above substrates. The coating was heated at 140° C. for 30 seconds to dry and cure it. When the silicone concentration was 2.5% and 0.75%, the amount of the silicone coated was 0.5 g/m², and 0.15 g/m² (upon drying), respectively.

An adhesive tape (24 mm width, CELLOTAPE ®, a product of Sekisui Kagaku Kogyo Kabushiki Kaisha) was bonded to the silicone coating of each of the resulting coated articles, and the assembly was aged at 70° C. for 24 hours under a load of 20 g/cm². The adhesive tape was then peeled at an angle of 180° at a rate of 300 mm/min. by a tension test, and the peel strength was measured. Furthermore, adhesion and peeling were repeated nine times at the part to which the adhesive tape had been applied. Then, the assembly was aged under the same conditions as above. The peel test was then performed to measure the remaining peel strength.

The relation between the amount of the silicone coated and the peel strength or the remaining peel strength is shown in Table 6.

TABLE 6

| | | | Amount of silicone coated | | | |
|---|---|---|---|---|---|---|
| | | | 0.5 g/m² | | 0.15 g/m² | |
| Example | No. | Substrate | Peel strength (g/24 mm) | Remaining peel strength (g/24/mm) | Peel strength (g/24 mm) | Remaining peel strength (g/24 mm) |
| Example 7 | 1 | A | 3.5 | 4.0 | 5.5 | 11 |
| | 2 | B | 5.0 | 6.0 | 8.5 | 14 |
| Comparative Example 5 | 1 | C | 18 | 52 | 45 | 110 |
| | 2 | D | 3.5 | 4.0 | 14 | 24 |

The above procedure was repeated except that the drying temperature after coating the silicone (2.5% concentration) was varied. The remaining peel strength (g/24 mm width) was measured. The drying time was 30 seconds. The results are shown in Table 7.

TABLE 7

| Example | No. | Substrate | Drying temperature (°C.) | | |
|---|---|---|---|---|---|
| | | | 140 | 120 | 110 |
| Example 7 | 1 | A | 4.0 | 4.5 | 3.5 |
| | 2 | B | 6.0 | 7.5 | 7.0 |
| Comparative Example 4 | 1 | C | 52 | 75 | 85 |
| | 2 | D | 4.0 | 50 | 48 |

What is claimed is:

1. A silicone-coated article having releasability imparted thereto by the coating of a silicone, wherein that surface of said article on which to coat the silicone is composed of a resin containing a polar group-containing olefinic resin comprising (a) 55 to 99% by weight of a unit derived from an olefin and (b) 1 to 45% by weight of a unit derived from a radical-polymerizable monomer containing a polar group selected from the class consisting of

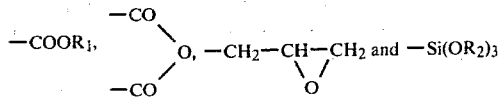

in which $R_1$ represents a hydrogen atom, a metal capable of forming a salt with the carboxyl group, or a monovalent hydrocarbon group, and $R_2$ represents a monovalent hydrocarbon group.

2. The article of claim 1 wherein said olefin is selected from $C_2$-$C_6$ olefins.

3. The article of claim 1 wherein said olefin is ethylene.

4. The article of claim 1 wherein said radical-polymerizable monomer is selected from the group consisting of $C_3$-$C_{11}$ unsaturated aliphatic monocarboxylic acids, the $C_1$-$C_8$ alkyl esters thereof, $C_4$-$C_6$ unsaturated aliphatic or $C_8$-$C_9$ unsaturated alicyclic dicarboxylic acids, the anhydrides of said dicarboxylic acids, vinyltri($C_1$-$C_8$ alkoxy) silanes, glycidyl acrylate and glycidyl methacrylate.

5. The article of claim 1 wherein said radical-polymerizable monomer is selected from the group consisting of acrylic acid, methacrylic acid, crotonic acid, isocrotonic acid, 1-undecylenic acid, maleic acid, fumaric acid, citraconic acid, itaconic acid, 5-norbornene-2,5-dicarboxylic acid, tetrahydrophthalic acid, maleic anhydride, itaconic anhydride, ethyl acrylate, butyl acrylate, methyl methacrylate, propyl methacrylate, vinyltrimethoxysilane and glycidyl methacrylate.

6. The article of claim 1 wherein said radical-polymerizable monomer is methacrylic acid, ethyl acrylate, maleic anhydride or vinyltrimethoxysilane.

7. The article of claim 1 wherein said olefinic copolymer comprises (a) 80 to 98% by weight of the unit derived from olefin and (b) 2 to 20% by weight of the unit derived from the radical-polymerizable monomer.

8. The article of claim 1 wherein said olefinic copolymer is an ethylene/methacrylic acid copolymer, an ethylene/methacrylic acid/isobutyl acrylate terpolymer, or a metal salt thereof.

9. The article of claim 1 wherein said olefinic copolymer is a maleic anhydride- or vinyltrimethoxysilane-grafted copolymer of polyethylene or ethylene/vinyl acetate copolymer.

10. The article of claim 1 wherein said resin containing said olefinic copolymer is said olefinic copolymer alone or a blend of said olefinic copolymer with another olefinic resin compatible with said olefinic copolymer.

11. The article of claim 1 which is a resin-coated paper having the resin surface layer comprising said olefinic copolymer.

12. The article of claim 1 which is a shaped article prepared from said resin containing said olefinic copolymer.

13. A method for producing a silicone-coated article, which comprises forming on the surface of a substrate to which releasability is to be imparted, a layer of a resin containing an olefinic copolymer comprising (a) 55 to 99% by weight of a unit derived from an olefin and (b) 1 to 45% by weight of a unit derived from a radical-polymerizable monomer having a polar group selected from the class consisting of

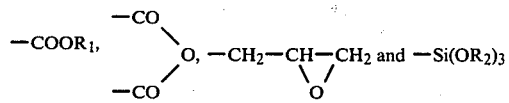

in which $R_1$ represents a hydrogen atom, a metal capable of forming a salt with the carboxyl group or a monovalent hydrocarbon group, and $R_2$ represents a monovalent hydrocarbon group, and then coating a silicone on the resin layer.

14. The method of claim 13 wherein said resin layer is formed by coating an aqueous dispersion of said olefinic copolymer on the surface of said substrate.

15. The method of claim 14 wherein said olefinic copolymer is a metal salt of an ethylene/methacrylic acid copolymer, or a metal salt of an ethylene/methacrylic acid/isobutyl acrylate terpolymer.

16. The method of claim 13 wherein said substrate is paper.

17. The method of claim 13 wherein said olefinic copolymer comprises (a) 80 to 98% by weight of the unit derived from olefin and (b) 2 to 20% by weight of the unit derived from the radical-polymerizable monomer.

* * * * *